United States Patent
Yamase et al.

(10) Patent No.: US 8,303,023 B2
(45) Date of Patent: Nov. 6, 2012

(54) COVER FOR A TAILGATE ROD PASSAGE

(75) Inventors: Shinichi Yamase, Dublin, OH (US);
Charles Haase, Delaware, OH (US);
Hiroaki Taniguchi, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 21 days.

(21) Appl. No.: 12/817,612

(22) Filed: Jun. 17, 2010

(65) Prior Publication Data
US 2011/0309649 A1    Dec. 22, 2011

(51) Int. Cl.
*B60J 10/08* (2006.01)
(52) U.S. Cl. .................................... 296/146.9
(58) Field of Classification Search ............... 296/146.9, 296/76, 56, 50, 57.1, 100.01, 100.02, 100.03, 296/100.04, 100.05, 100.06, 100.07, 100.09, 296/100.1, 146.8; 219/689; 280/728.2, 730.2; 224/404; 220/714, 717; 160/201
See application file for complete search history.

(56) References Cited

U.S. PATENT DOCUMENTS

| | | | |
|---|---|---|---|
| 4,415,194 A | 11/1983 | Bauer | |
| 4,880,267 A * | 11/1989 | Ohya | 296/56 |
| 6,799,790 B2 * | 10/2004 | Sakai et al. | 296/146.8 |
| 6,824,201 B2 | 11/2004 | Miyazaki | |
| 7,758,066 B2 * | 7/2010 | Sia et al. | 280/728.2 |
| 7,810,865 B2 * | 10/2010 | Costigan | 296/146.9 |
| 7,837,252 B2 * | 11/2010 | Etou et al. | 296/146.4 |
| 8,002,329 B2 * | 8/2011 | Etou et al. | 296/146.4 |
| 2006/0071503 A1 | 4/2006 | Miyake | |
| 2009/0250911 A1 | 10/2009 | Sia | |

* cited by examiner

*Primary Examiner* — Kiran B Patel
(74) *Attorney, Agent, or Firm* — Fay Sharpe LLP

(57) ABSTRACT

A rear pillar of an automotive vehicle housing a power tailgate assembly and a garnish covering the rear pillar. The garnish includes an opening through which a tailgate rod extends and interconnects the power tailgate assembly and the tailgate of the automobile. A cover closes the opening and comprises an elongated body of a resilient material including an upper region having a passage sized to accommodate the tailgate rod and lower region having a "T" shaped slot intersecting the passage.

13 Claims, 3 Drawing Sheets

COVER FOR A TAILGATE ROD PASSAGE

BACKGROUND

The present disclosure relates generally to a cover or a tailgate rod passage in the rear pillar assembly of an automobile.

The advantages of providing a vehicle, such as a van or sport utility, with a tailgate for cargo access has been recognized for many years. Moreover, these vehicles provide rear storage compartments which can be accessed to receive large items via a lift-gate that opens substantially the entire rear of the vehicle.

A lift type tailgate that swings upward about a horizontal axis to open can require significant lifting force to effect opening. For the convenience of the person using a vehicle having a lift type tailgate, it may be desired that a power lift system be provided to reduce the required lifting effort, particularly where the tailgate is a heavy singular gate or door that closes the entire rear access opening.

Various forms of power lift tailgate systems have been proposed. Typically, they include a motor conditioned to drive a rod which is connected to the tailgate. One option for concealing the motor is to position it in the vehicle's rear pillar. A rear pillar garnish provides a decorative and protective means to cover the power tailgate motor and other components, such as wiring harnesses, clips, speakers, etc., mounted on the rear pillar of the automotive vehicle. As described above, a rod must extend through the garnish to facilitate connection to the tailgate. A passage is therefore provided for the rod and a cover that seals the passage is provided to conceal the internal pillar components for asthetic and safety purposes.

SUMMARY OF THE DISCLOSURE

Various details of the present disclosure are hereinafter summarized to provide a basic understanding. This summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

According to one embodiment, a cover for a power tailgate rod garnish opening is provided. The cover is an elongated body formed of a resilient material. It includes a first region having a passage sized to accomodate the tailgate rod and a second region having a "T" shaped slot intersecting the passage and extending therefrom.

According to a further embodiment, a rear pillar of an automotive vehicle is described. A power tailgate assembly is provided within the rear pillar. A garnish including an opening through which a tailgate rod extends covers the rear pillar. The tailgate rod connects the power tailgate assembly to a rear tailgate. A cover closing the opening is also provided. The cover has an elongated body of a resilient material including an upper region having a passage sized to accommodate the tailgate rod and a lower region having a "T" shaped slot intersecting the passage and extending therefrom.

According to another embodiment, a cover for a power tailgate rod garnish opening is provided. The cover is a body of a resilient material including a cupped first region having a passage sized to accommodate the tailgate rod and a lower region including a slot intersecting the passage.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
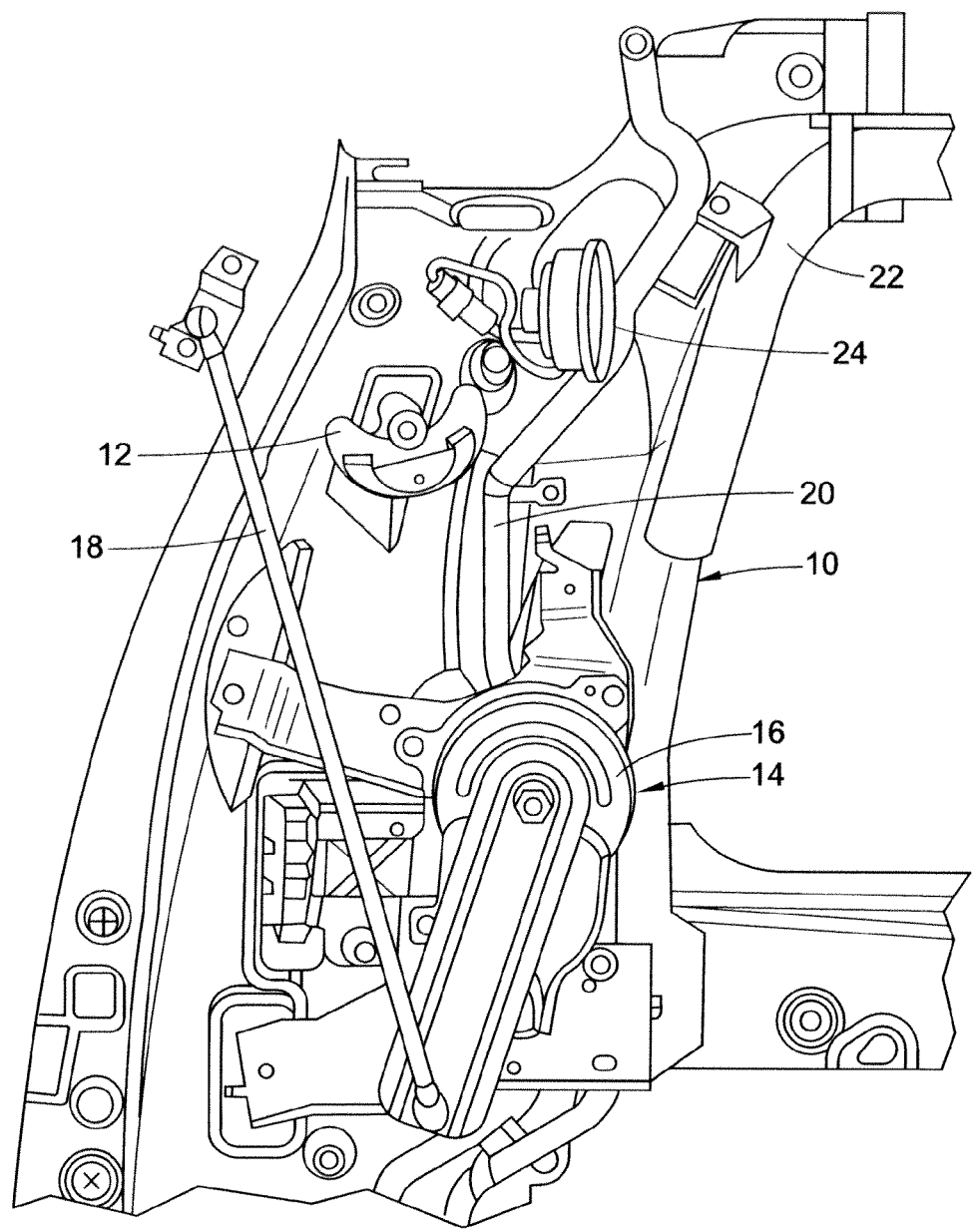
FIG. 1 is a side view of a rear pillar.

One or more embodiments or implementations are hereinafter described in conjunction with the drawings, where like reference numerals are used to refer to like elements throughout, and where the various features are not necessarily drawn to scale.

Referring now to the drawings, FIG. 1 shows a rear pillar 10 for an automotive vehicle. The rear pillar 10 accomodates multiple components including seat belt D-ring 12, power tailgate assembly 14 comprised of a power tailgate motor 16 and a power tailgate rod 18, electrical wire harness 20, a side curtain air bag 22 and a speaker 24.

Figure 2:
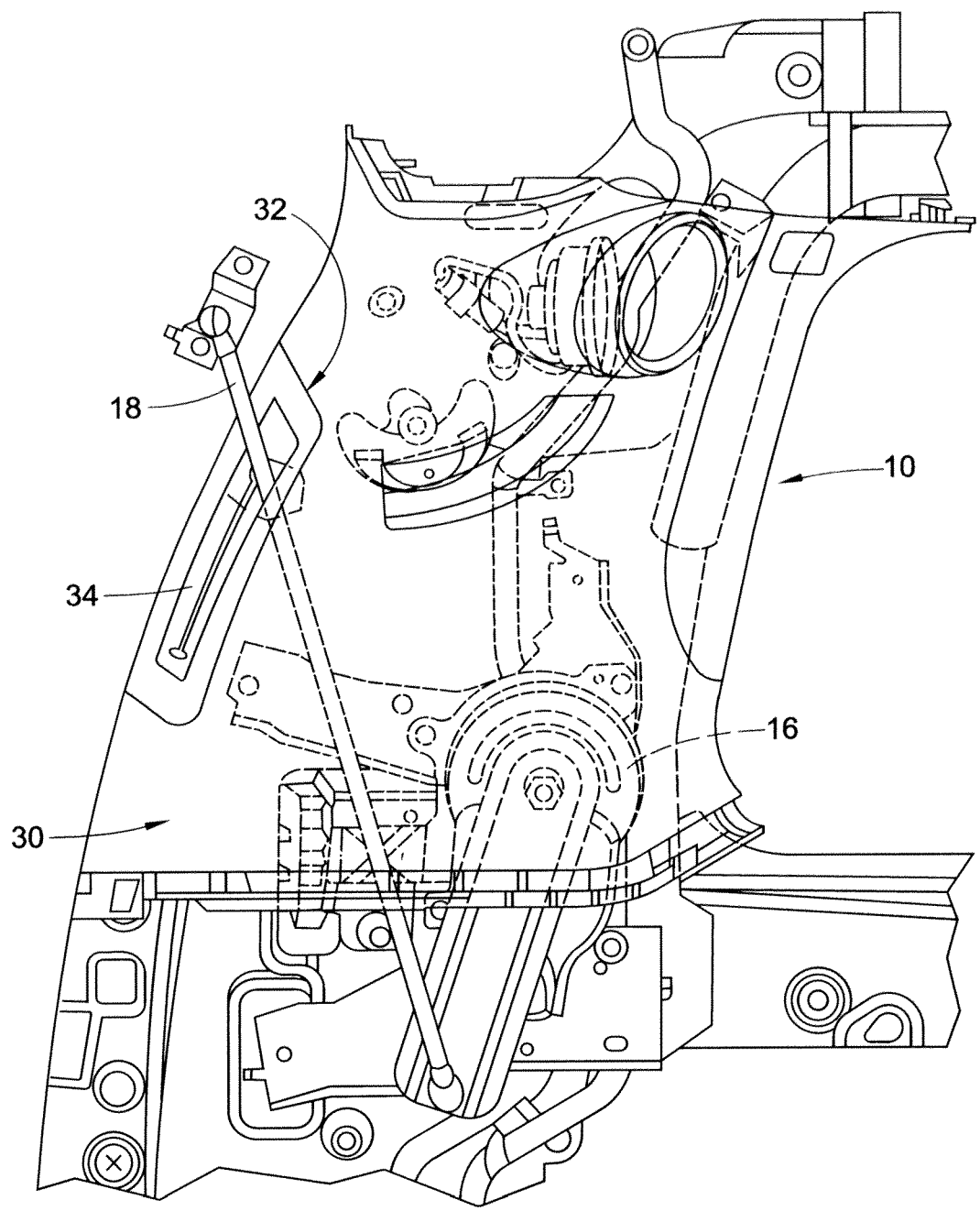
FIG. 2 is a side view of the rear pillar of FIG. 1 including a superimposed garnish applied thereto.

FIG. 2 shows a rear pillar garnish assembly 30 superimposed over the rear pillar 10. The garnish assembly 30 attaches to the rear pillar 10 thereby providing a protective cover for the above mentioned components, including the power tailgate motor 16. The garnish assembly 30 includes a rectangular shaped opening 32 which receives cover 34. The cover 34 is received in rectangular shaped opening 32 via an interference fit, but could also be retained via a mechanical joinder (such as screws or bolts) or adhesively. It can be formed, for example, from an olefinic polymer such as polyethylene or polypropylene, an engineered resin such as polycarbonate or an elastomeric polymer such as styrene-butadiene copolymer.

Figure 3:
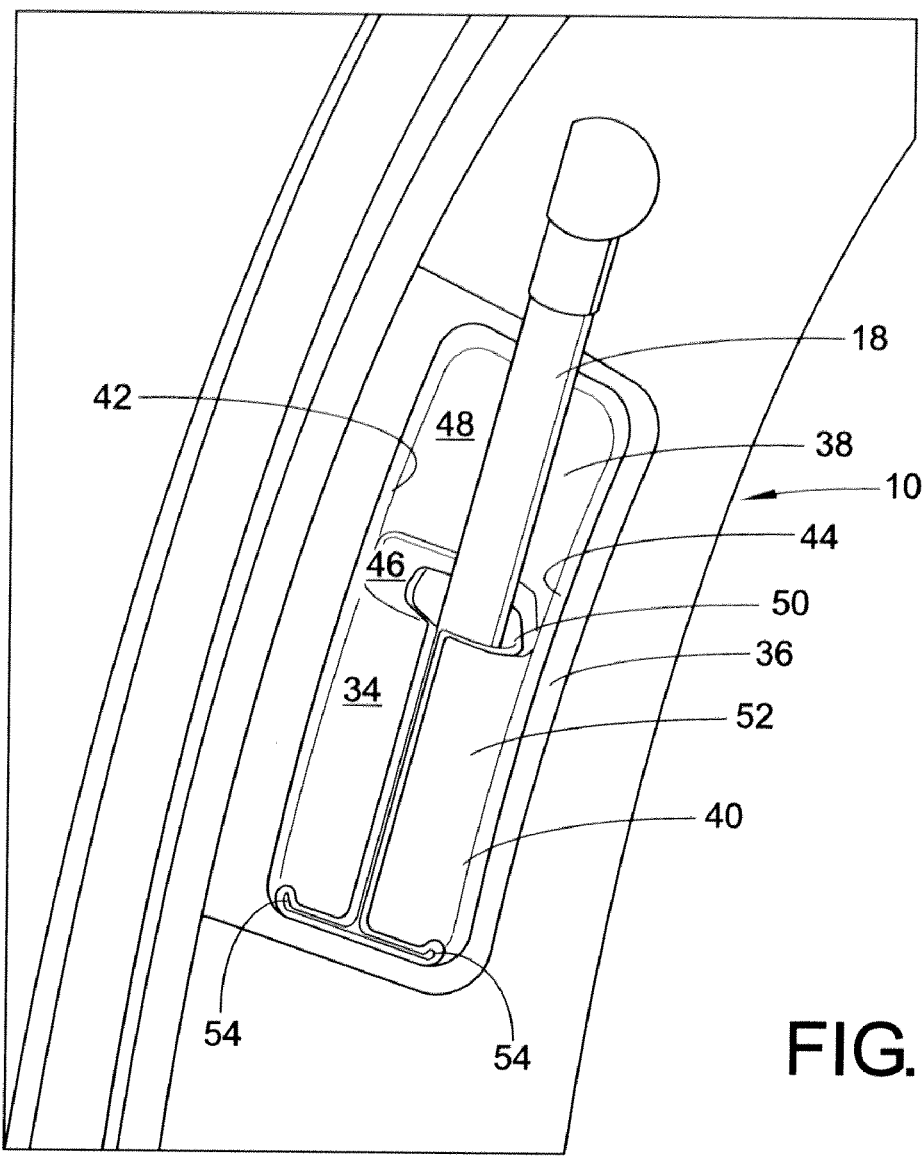
FIG. 3 is a perspective view of the rear pillar assembly tailgate rod passage cover.
Figure 4:
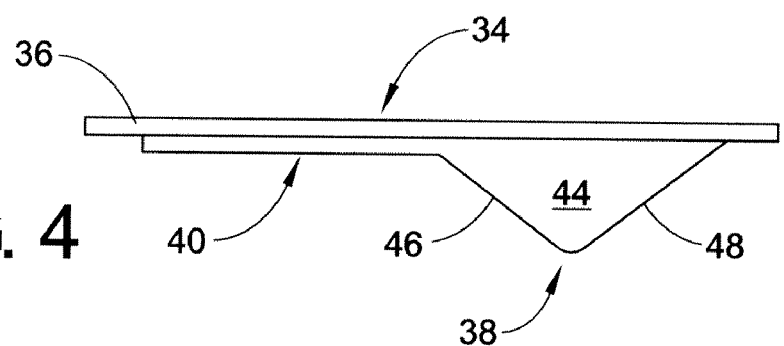
FIG. 4 is a side elevation view of the cover of FIG. 3.

Referring now to FIGS. 3 and 4, the cover 34 includes a generally rectangular shaped rim 36. An upper region of the cover 34 includes a cup 38. Cup 38 has a generally "V" shape including opposed sidewalls 42, 44 and "V" walls 46, 48. Wall 46 includes passage 50 through which tailgate lift rod 18 passes to allow engagement with a tailgate (not shown). Locating the passage 50 on the angled wall of cup 38 advantageously allows the rod 18 to exit the cover substantially normal to the wall. This allows the hole to be relatively small with a close tolerance that reduces visual and physical access to an interior of the garnish assembly 30.

A lower region of the cover 34 is a substantially planar body 40. An elongated "T" shaped slot 52 is formed in the flexible material of lower region 40. During operation of the power tailgate assembly 14, the flexible cover 34 material flexes such that the cover 34 does not inhibit the motion of the power tailgate rod 18. The slot 52 further includes upwardly inclined tails 54 which increase the deformability of the planar region as the tailgate rod 18 passes within the slot 52.

According to alternative embodiments, the passage 50 can be substantially circular or elliptical, or take another shape suitable to the particular application. Furthermore, the slot can intersect the passage off-center. While the cup is shown as generally V-shaped in cross-section, alternative shapes can provide similar advantages. Similarly, it is not necessary that the rear pillar garnish opening be rectangular. Accordingly, the shape of the cover would vary to match the contour of the garnish opening.

The depicted cover provides an improved passage in the rear pillar garnish for the tailgate rod. The passage/slot in the cover allow a full range of motion for the rod during tailgate stroke. The design minimizes the accessibility (visually and physically) to the internal mechanisms.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

We claim:

1. A cover for a power tailgate rod garnish passage comprising an elongated body of a resilient material including a cup shaped first region having a passage sized to accommodate said power tailgate rod and a second region having a "T" shaped slot intersecting said passage and extending therefrom.

2. The cover of claim 1 wherein said passage is one of substantially circular and elliptical.

3. The cover of claim 1 wherein said slot intersects said passage off-center.

4. The cover of claim 1 further including a rim surrounding said body.

5. The cover of claim 1 wherein said cup shaped first region is generally V-shaped in cross-section.

6. The cover of claim 1 wherein said second region is substantially planar.

7. The cover of claim 5 wherein said passage resides on a wall of said V-shaped cup adjacent said second region.

8. The cover of claim 1 wherein a head portion of said "T" shaped slot includes upwardly tapered tails.

9. The cover of claim 1 being comprised of plastic.

10. A cover for a power tailgate rod garnish passage comprising an elongated body of a resilient material including a first region having a substantially circular or elliptical passage sized to accommodate said power tailgate rod and a second region having a "T" shaped slot intersecting said passage off-center and extending therefrom;
wherein a head portion of said "T" shaped slot includes upwardly tapered tails.

11. The cover of claim 10 further including a rim surrounding said body.

12. A cover for a power tailgate rod garnish passage comprising an elongated body of a resilient material including a first region having a passage sized to accommodate said power tailgate rod and a second region having a "T" shaped slot intersecting said passage and extending therefrom, wherein a head portion of said "T" shaped slot includes upwardly tapered tails.

13. The cover of claim 12 further including a rim surrounding said body.

* * * * *